J. A. BRANT.
BOTTLE HOLDER.
APPLICATION FILED OCT. 29, 1920.

1,386,392.

Patented Aug. 2, 1921.
2 SHEETS—SHEET 1.

Jacob A. Brant,
Inventor

By
Attorney

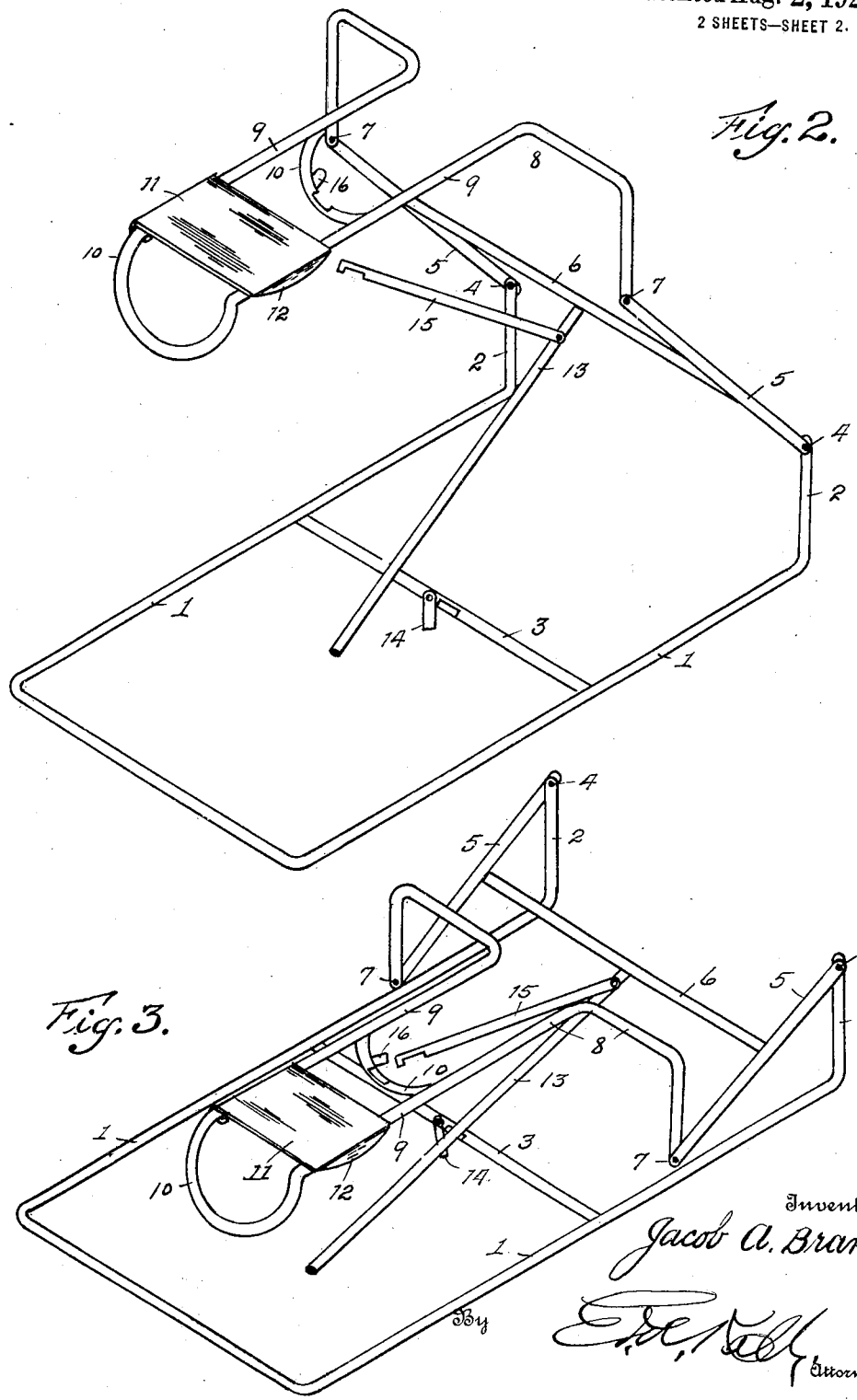

UNITED STATES PATENT OFFICE.

JACOB A. BRANT, OF READING, PENNSYLVANIA.

BOTTLE-HOLDER.

1,386,392.  Specification of Letters Patent.  Patented Aug. 2, 1921.

Application filed October 29, 1920. Serial No. 420,348.

*To all whom it may concern:*

Be it known that I, JACOB A. BRANT, a citizen of the United States, residing at Reading, in the county of Berks and State of Pennsylvania, have invented certain new and useful Improvements in Bottle-Holders, of which the following is a specification.

This invention relates to improvements in bottle holders and the object in the present instance is to provide a simple and effective means for supporting a child's nursing bottle.

The invention consists of a collapsible support, preferably made of wire or like material, and formed in sections, hinged together for folding when not in use, and provided with securing means for holding it in open or operating position.

The invention contemplates a device suitable for supporting a nursing bottle in the child's bed or crib, and it is provided with a base member adapted to slide beneath the pillow, whereby the bottle supported thereby will always be held in close proximity to the child's head.

The invention is more fully described in the following specification and clearly illustrated in the accompanying drawings in which:—

Fig. 2 is a like perspective view, partially folded.

Fig. 3 is a like perspective view, completely folded.

Figure 1:
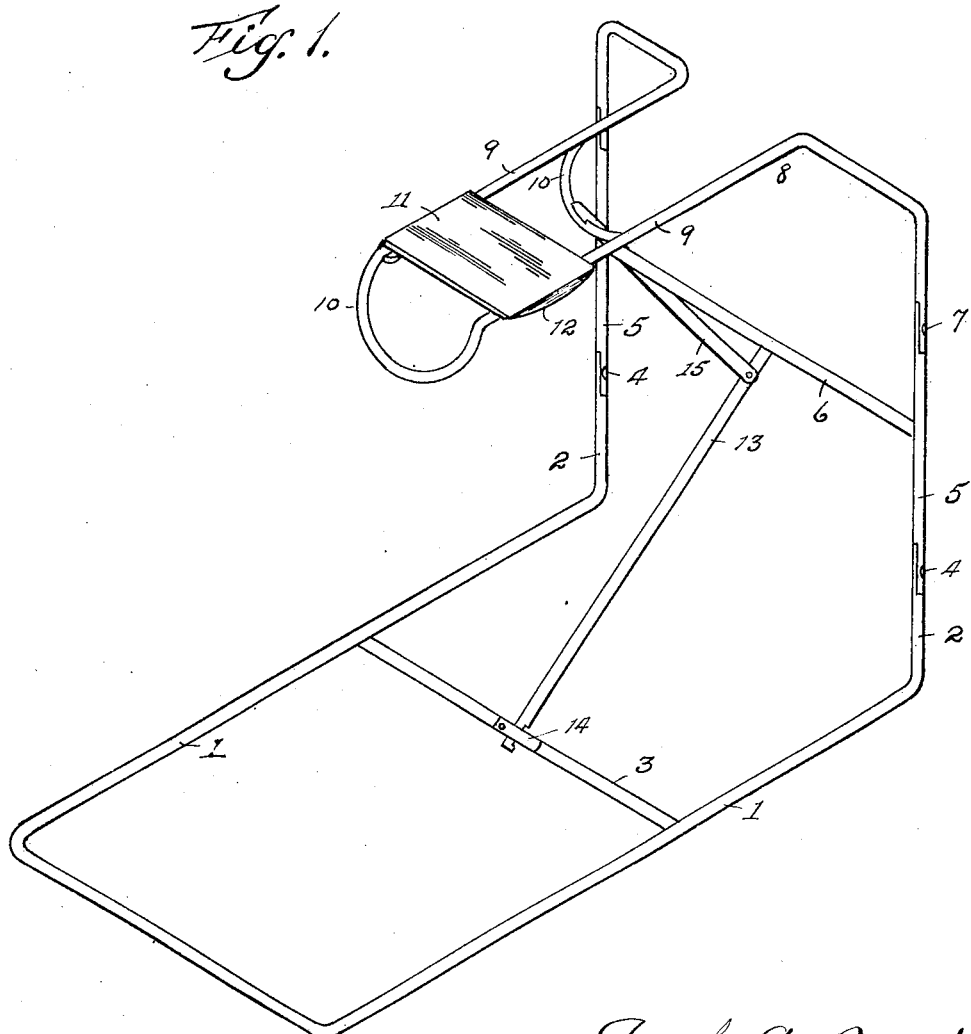
Figure 1 is a perspective view of my improved holder, in open position, ready to receive the bottle.

The numeral 1 designates a substantially rectangular base member, open at one end and formed at that end with parallel uprights 2; the longitudinal bars of the base member are joined by a rod 3 about midway of their length.

To the upper extremities of the uprights 2, I have secured by means of a pivot 4, a pair of arms 5, which are also joined by a rod 6 and to the upper extremities of these arms I secure, by means of pivots 7, the bottle rack 8.

This rack member 8 comprises two parallel arms 9 in which a bottle is adapted to rest and be supported, and these arms are formed with two substantially semi-circular connecting bars 10, to approximate the contour of the bottle; one of these curved arms is located at the extreme end of the rack member and in close proximity thereto, and lying across the top of the rack I provide a clamping plate 11, hingedly connected at one of its ends to one of the arms 9 and adapted to engage the opposite member 9 through the medium of any suitable catch 12.

To the rod 6 I have formed an integral brace member 13, the free end of which is adapted to engage the rod 3 which is provided with a catch lever 14 for holding it in position thereon. This brace 13 is also formed with a link 15, pivoted thereto at a point near its upper end, and the free end of this link is adapted for engagement with one of the curved connecting bars 10 of the rack, which is also provided with a catch lever 16 for securing it thereto.

It will be noted therefore, that when the device is in open position, as shown in Fig. 1, the bottle will lie in the rack 8, with the nipple end projecting beyond the end thereof, and, with the base member placed beneath the pillow, this will bring the nipple in about the proper position for use.

When it is desired to fold the device, the brace and its link are released from engagement with the base and the rack member, and the parts will fold into the position shown in Fig. 3, making a compact parcel, suitable for packing or shipping, or to be stored into a comparatively small space.

It is evident that the particular details of construction disclosed may be varied without departing from the spirit of my invention, but:

What I claim and desire to secure by Letters Patent is:—

1. In a bottle holder, the combination of a base member, an upright member hingedly connected thereto, a bottle carrying rack hingedly connected to the upright member, means connecting the base member with the rack member for locking them in open position, and a bottle clamp carried by the rack member.

2. In a bottle holder, the combination of a rectangular base member having two upwardly projecting end portions, uprights hinged to said portions, a bottle carrying rack hingedly connected to the uprights, a brace carried by the uprights and having connecting means with the base member, a link carried by the brace and having connecting means with the rack, and a clamp member hinged to the rack member for holding a bottle therein.

3. As a new article of manufacture, a rectangular base member of wire, uprights hinged thereto, a bottle rack hinged to the uprights, a brace connecting the uprights and the base member, a link connecting the brace and the rack and means for securing a bottle in the rack.

In testimony whereof I affix my signature.

JACOB A. BRANT.